United States Patent [19]

Oishi et al.

[11] 4,125,758
[45] Nov. 14, 1978

[54] VERTICAL WELDING METHOD

[75] Inventors: Minoru Oishi, Fujisawa; Keiichiro Hirakoso, Tokyo; Katsuro Iio, Fujisawa; Yasuhiro Nagai, Chigasaki; Tetsurou Nariai, Kamakura, all of Japan

[73] Assignee: Kobe Steel, Ltd., Kobe, Japan

[21] Appl. No.: 667,954

[22] Filed: Mar. 18, 1976

[30] Foreign Application Priority Data

Mar. 18, 1975 [JP] Japan .................................. 50-31862
May 1, 1975 [JP] Japan .................................. 50-52068

[51] Int. Cl.$^2$ ............................................. B23K 9/00
[52] U.S. Cl. ................................. 219/126; 219/73.1; 219/145.22
[58] Field of Search ............. 219/145, 146, 126, 73 A, 219/73.1, 145.22

[56] References Cited

U.S. PATENT DOCUMENTS

| | | | |
|---|---|---|---|
| 3,177,340 | 4/1965 | Danhier | 219/146 |
| 3,474,518 | 10/1969 | Strandell | 219/146 |
| 3,625,757 | 12/1971 | Wiehe | 219/73 A |
| 3,806,695 | 4/1974 | Carroll | 219/73 A |
| 3,825,721 | 7/1974 | Carroll | 219/146 |
| 3,832,523 | 8/1974 | Kitani | 219/137 R |
| 3,875,363 | 4/1975 | Arikawa | 219/146 |

OTHER PUBLICATIONS

Arcos Vertomatic Welding Equipment, Cover Page 1970.

*Primary Examiner*—E. A. Goldberg
*Attorney, Agent, or Firm*—Oblon, Fisher, Spivak, McClelland & Maier

[57] ABSTRACT

The present invention relates to a method of vertically upward arc welding for vertical and inclined joints. More particularly, the invention relates to a vertically upward arc welding method which includes the step of feeding a strip electrode in a direction at which the plane including the width direction of the strip electrode crosses the weld line, generating an arc from the strip electrode to a molten pool and/or an upper base metal disposed above the surface of the molten pool, melting the upper base metal disposed above a sliding backing shoe on the front surface side of the groove, and performing welding by expanding the groove and simultaneously dropping the molten metal onto the lower molten pool and depositing the same therein.

12 Claims, 17 Drawing Figures

VERTICAL WELDING METHOD

BACKGROUND OF THE INVENTION

1. Field of the Invention

The present invention relates generally to arc welding, and more particularly to a method of vertically upward arc welding for vertical and inclined joints.

2. Description of the Prior Art

As the conventional method of high efficiency welding of vertical joints, there are known various methods, such as electroslag welding, electrogas welding and consumable nozzle electroslag welding methods, and these methods have been employed in the art. In each of these known welding methods, since a groove gap is necessary, the sectional area of the groove is large, resulting in disadvantages such as excessive heat input and relatively low welding speed. Accordingly, problems are left unsolved as regards the welding efficiency and the toughness of the heat-affected zone.

Recently, as a means of overcoming the foregoing disadvantages of the conventional welding methos, there has been proposed a vertical welding method in which a small diameter wire electrode is oscillated and welding is conducted in an atmosphere of carbon dioxide gas and/or other inert gases, and this method is practiced in some plants. However, since the diameter of the wire is small, when thick plates are welded, it is necessary to weave the wire or to move the wire back and forth in the direction of the plate thickness, as disclosed in Japanese patent publications Nos. 9857/70, and 50504/72, and because of the use of a small diameter wire, the applied welding current is low and since the penetration depth is shallow, if a groove gap is not sufficiently provided, no reverse bead is formed, and the lack of fusion may occur. Furthermore, since a groove gap is necessary, the sectional area of the groove is increased and a large heat input is necessary. Accordingly, the problem of a low welding speed is not solved. Moreover, since the penetration depth is shallow, there is brought about the disadvantage that the allowable range of the groove accuracy is very narrow.

Japanese Patent application laid-open specification No. 93240/74 proposes a narrow groove vertical welding method in which a strip electrode is inserted along the bisectional plane of an I-shaped groove gap. According to this method, it is impossible to generate an arc from the electrode to an upper base metal disposed above the surface of a molten pool or to melt the upper base metal over a sliding backing shoe on the front surface side of the groove. Accordingly, this method cannot be accurately applied to the welding of a narrow groove.

Still further, Japanese patent application laid-open specification No. 96945/74 discloses a vertically upward welding method using a strip electrode. According to this method, the strip electrode is fed with an inclination of a certain angle with respect to the weld line in compliance with the inclination of a welding crater. This method is characterized in that a relatively small current is used and slagging of a molten metal to the front side of the groove is prevented by the arc force of the inclined strip electrode. Accordingly, this method involves a problem that high-speed high-efficiency welding using the large current is impossible.

SUMMARY OF THE INVENTION

The present invention has been completed as a result of our research works made with the view of developing a welding method for overcoming the foregoing disadvantages involved in the conventional techniques.

It is therefore a primary object of the present invention to provide a method in which joints having a very small groove sectional area can be welded at a high efficiency according to the vertically upward welding technique.

A second object of the present invention is to provide a vertically upward welding method capable of providing a heat-affected zone excellent in toughness.

A third object of the present invention is to provide a narrow-groove vertically upward welding method in which consumption of the wire is much reduced.

In accordance with a first embodiment of the present invention attaining the foregoing and other objects, there is provided a vertically upward arc welding method comprising the steps of feeding a strip electrode in a direction at which the plane including the width direction of the electrode crosses the weld line, generating an arc from the electrode to a molten pool and/or an upper base metal disposed above the surface of the molten pool, melting the upper base metal over a sliding backing strip on the front surface side of the groove, and performing welding by expanding the groove space and simultaneously dropping the molten metal onto the lower molten pool and depositing the same therein.

In accordance with a second embodiment of the present invention, there is provided a vertically upward welding method as set forth in the first embodiment, wherein the weld zone is shielded by a gas.

In accordance with a third embodiment of the present invention, there is provided a vertically upward arc welding method as set forth in the first embodiment, wherein a welding current of 500 to 3000 Amp is used.

In accordance with a fourth embodiment of the present invention, there is provided a vertically upward arc welding method as set forth in the first embodiment, wherein the angle formed between the welding advance direction and the strip electrode is 20° to 90°.

In accordance with a fifth embodiment of the present invention, there is provided a vertically upward arc welding method as set forth in the first embodiment, wherein the angle formed between the weld line and the width direction of the strip electrode is 40° to 140°.

In accordance with a sixth embodiment of the present invention, there is provided a vertically upward arc welding method as set forth in the first embodiment, wherein the ratio of the width of the strip electrode to the groove gap on the front side of the base metal is adjusted to from 1 : 0.2 to 1 : 5.

In accordance with a seventh embodiment of the present invention, there is provided a vertically upward arc welding method as set forth in the first embodiment, wherein the strip electrode used consists essentially of up to 0.15% of C, 0.3 to 3.0% of Mn, 0.05 to 0.95% of Si and 0.05 to 0.7% of Mo as indispensable components, the balance being unavoidable impurities and iron.

In accordance with an eighth embodiment of the present invention, there is provided a vertically upward arc welding method as set forth in the first embodiment, wherein the strip electrode used is a consumable strip electrode consisting essentially of up to 0.15% of C, 0.3 to 3.0% of Mn, 0.05 to 0.95% of Si and 0.05 to 0.7% of Mo as indispensable components, and at least one member selected from the group consisting of 0.001 to 0.3% of Ti, up to 0.05% of Al, 0.001% to 0.05% of B, 0.001% to 0.1% of Zr and 0.001 to 0.05% of Nb, the balance being unavoidable impurities and iron.

In accordance with a ninth embodiment of the present invention, there is provided a vertically upward arc welding method as set forth in the first embodiment, wherein a flux is incorporated in the strip electrode.

In accordance with a tenth embodiment of the present invention, there is provided a vertically upward arc welding method as set forth in the ninth embodiment, wherein the flux is filled in an amount of 3 to 60% based on the total weight of the strip electrode and particles having a size of 74 to 297$\mu$ occupy at least 20% of the total weight of the flux.

In accordance with an eleventh embodiment of the present invention, there is provided a vertically upward arc welding method as set forth in the ninth embodiment, wherein the flux comprises, in percent based on the total weight of the strip electrode, 0.4 to 3.0% of Mn, 0.01 to 1.0% of Si, 0.05 to 1.5% of Mo, 0.1 to 15% of slag forming agents and 0.01 to 10% of the metal fluorides.

In accordance with a twelfth embodiment of the present invention, there is provided a vertically upward arc welding method as set forth in the eleventh embodiment, wherein the flux further comprises, in percent based on the total weight of the strip electrode, at least one of 0.001 to 0.6% of Ti, 0.001 to 0.1% of Zr, 0.01 to 0.05% of B, up to 0.05% of Al and 0.001 to 0.05% of Nb.

In accordance with a thirteenth embodiment of the present invention, there is provided a vertically upward arc welding method as set foth in the eleventh embodiment, wherein the slag forming agents comprise 0.01% of $SiO_2$ by weight of the total weight of the strip electrode.

In accordance with a fourteenth embodiment of the present invention, there is provided a vertically upward arc welding method as set forth in the ninth embodiment, wherein the flux further comprises, in percent by weight of the total strip electrode, at least one of 0.01 to 5.0% of Ni, 0.01 to 8.0% of Cr and 0.01 to 3.0% of Cu.

In accordance with a fifteenth embodiment of the present invention, there is provided a vertically upward arc welding method as set forth in the first embodiment, wherein a filler metal is fed to the vicinity of the arc generated from the strip electrode.

In accordance with a sixteenth embodiment of the present invention, there is provided a vertically upward arc welding method as set forth in the first embodiment, wherein a filler metal is disposed in advance within the groove.

In accordance with a seventeenth embodiment of the present invention, there is provided a vertically upward arc welding method as set forth in the first embodiment, wherein on performing the welding while supporting the molten pool from the front surface side of the groove by the sliding backing shoe, at least one inspection hole is formed on the sliding backing shoe and the molten pool is detected through the hole by a photodetector, whereby the rising speed of the sliding backing shoe is made synchronous with the rising speed of the surface of the molten pool.

BRIEF DESCRIPTION OF THE DRAWINGS

Various other objects, features, and attendant advantages, of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

The method of the present invention will now be described in detail while comparing it with the conventional welding method by reference to the accompanying drawings.

Figure 1:
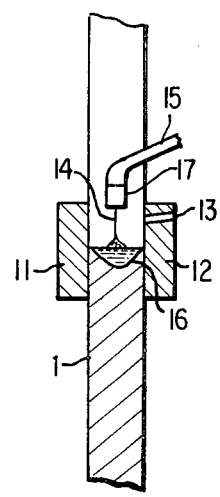
FIG. 1 is a diagram showing the conventional electrogas arc welding method.
Figure 2:
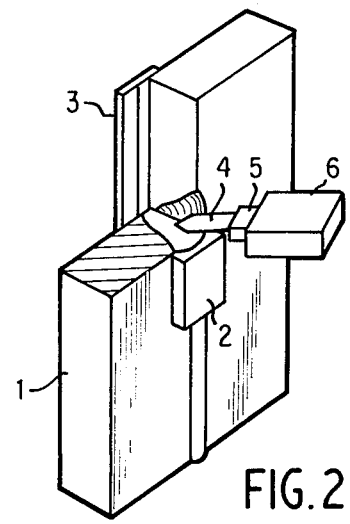
FIG. 2 is a perspective view showing the vertically upward arc welding method of the present invention.

The conventional electrogas arc welding method is first described by reference to FIG. 1. Referring to FIG. 1, a suitable groove root gap is maintained in a material 1 to be welded, and sliding cooling copper backing shoes 11 and 12 are closely fitted to the material 1 to be welded on both the front and back sides thereof. A shielding gas feed inlet 13 is mounted on the front side sliding cooling copper backing shoe 12, and an electrode wire 14 is fed to the clearance between the sliding cooling copper backing shoes 11 and 12 through a wire feed nozzle 15 and an electricity-applying tip 17. An arc is generated at a position indicated in FIG. 1. A molten pool 16 is controlled substantially at the center between the sliding cooling copper backing shoes 11 and 12, and it is not located above the shielding gas feed inlet opening 13. The reason is that if the molten pool 16 is located above the shielding gas feed inlet opening 13, the molten metal overflows the shielding gas feed inlet opening 13 to make sliding of the cooling copper backing shoes impossible and further, since feeding of a shielding gas is made impossible, welding becomes impossible.

The reason why a broad groove root gap should be maintained in accordance with this electrogas arc welding method is as follows:

A flux-cored wire is generally used as the electrode wire 14 in electrogas arc welding, and this electrode wire should be fed parallel to the weld line. Accordingly, the electricity-applying tip 17 and the goosenecked wire feed nozzle 15 should be inserted in the groove. Since the electricity-applying tip is cooled by water, it has, for example, a sectional shape having a longitudinal side of 6 to 7 mm and a lateral side of 20 to 25 mm, and a feed hole is formed at the center thereof. Accordingly, the groove should be at least such that the electricity-applying tip having a width of 6 to 7 mm can be inserted therein. Furthermore, when the electricity-applying tip falls in contact with a material to be welded, a welding machine is damaged. Accordingly, in general, a groove gap of about 15 to about 17 mm is necessary.

Since a broad groove gap should be maintained as noted thereinabove, the welding speed should inevitably be lowered, and the heat input should become large. Furthermore, if the wire electrode deviates from the center, the bead shape is affected and the bead becomes non-uniform.

If it is intended to increase the ascent speed by elevating the current, formation of spatters is inhanced and the shielding gas feed opening is jammed thereby forming blow holes, resulting in insufficient feeding of the shielding gas. Furthermore, as the spatters adhere to the surface of the material to be welded, the adhesion state of the sliding cooling copper backing shoe becomes worse or the welding operation becomes dangerous to an operator. Accordingly, in the conventional electrogas arc welding method, it is not permissible to elevate the welding current.

Figure 3:
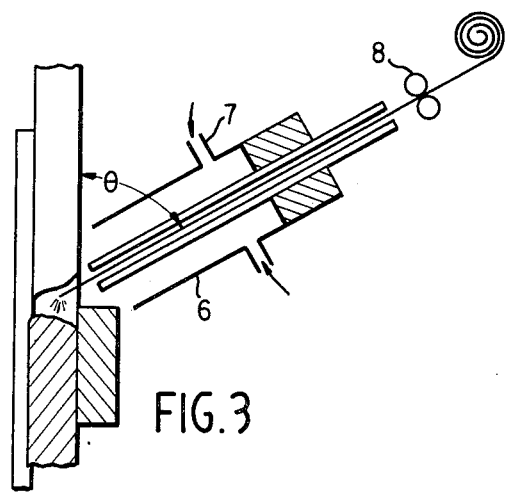
FIG. 3 is a longitudinal sectional view showing the vertically upward arc welding method of the present invention.
Figure 4:
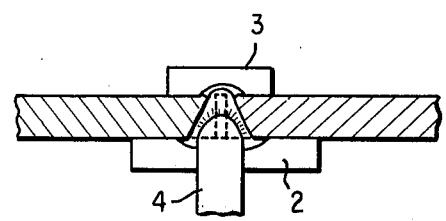
FIG. 4 is a horizontal cross-sectional view showing the vertically upward arc welding method of the present invention.

An embodiment of the method of the present invention is illustrated in FIGS. 2 to 5, in which a material to be welded, 1 a sliding cooling copper backing shoe, 2 a backing water-cooling copper plate, 3 a strip electrode 4, an electricity-applying tip 5, a shielding gas feed nozzle 6, a shielding gas feed inlet opening 7 and a strip electrode feed roller 8, are respectively disposed as illustrated. In FIGS. 2 to 5, the strip electrode 4 is fed into the groove through the electricity-applying tip 5 by the feed roller 8. The material 1 to be welded is sandwiched between the sliding cooling copper plate 2 and the backing cooling copper plate 3 which hold a molten pool therebetween. A shield gas is fed from the shielding gas feed inlet opening 7 and passed through the shielding gas feed nozzle 6 to protect the molten pool and arc. The strip electrode 4 is fed in a direction in which the plane including the width direction of the strip electrode 4 crosses the weld line. More specifically, as shown in FIG. 3, the angle θ between the axial line of the strip electrode 4 and the welding advance direction is preferably within a range of 20° to 90° as described hereinafter. Welding is conducted in a narrow groove as indicated by the broken line in FIG. 4. It is preferred that the angle between the width direction of the strip electrode and the weld line be within a range of 40° to 140°. If the electrode having a width broader than the groove root gap is employed, the material 1 to be welded is molten in the deeply excavated state as shown in FIG. 4, and a fresh broad groove is formed. Furthermore, since the strip electrode 4 generates an arc along the configuration of the groove, it is unnecessary to perform oscillations as in the conventional method, and occurence of defects such as lack of fusion can be prevented.

Figure 5:
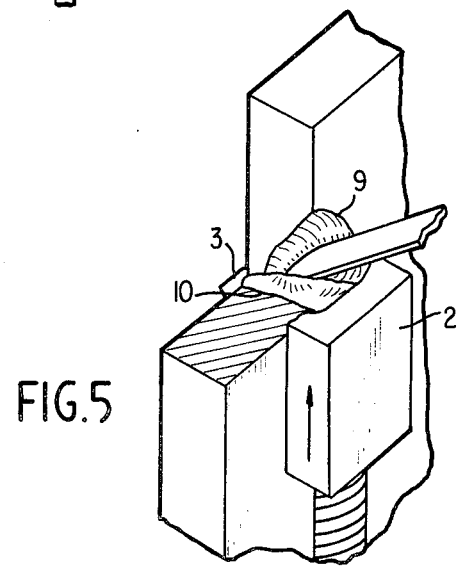
FIG. 5 is an enlarged perspective view showing the vicinity of the arc in the vertically upward arc welding method of the present invention.

FIG. 5 shows the material 1 to be welded, from which one side is taken out so as to clearly illustrate the arc-generating point. In FIG. 5, the material 1 to be welded is excavated by the strip electrode 4 so as to form an excavated portion 9. More specifically, the material 1 to be welded is rendered molten by the strip electrode 4, and the molten metal of the strip electrode and the molten metal of the material 1 to be welded are conducted into the thus formed broad groove so as to form a molten pool 10. This molten pool 10 is held by the sliding cooling copper plate 2 and the backing cooling copper plate 3, and since the molten pool 10 is cooled rapidly, it is rapidly solidified and hence, sagging of the bead is prevented. Since the strip electrode 4 and sliding cooling plate 2 are placed on the same carriage, the foregoing steps are conducted in succession, and a good weld can be obtained.

The method of the present invention will now be compared with the conventional electrogas arc welding method by reference to the foregoing illustration. In the conventional electrogas welding method, since a consumable electrode wire should be fed to the substantially central portion of the molten pool, it is necessary to insert the electricity-applying tip 17 into the groove, and further, in order to prevent the electricity-applying tip 17 from coming into contact with the material 1 to be welded, it is necessary to maintain a broad groove root gap. For example, in the case of welding steel plates having a thickness of 25 mm, there is generally adopted a V-shaped groove of 20° and a gap of 15 to 18 mm. In contrast, according to the present invention, since the strip electrode 4 is employed, the electricity-applying tip 5 is located outside the groove. Accordingly, it is unnecessary to broaden the groove root gap. Furthermore, welding is conducted while forming a fresh groove by excavating the groove by means of the strip electrode 4, and therefore, the groove root gap need not be broadened. For example, in the instance the material having a thickness of 25 mm is welded, even if the groove root gap is 0 mm in a V-shaped groove of 20°, a reverse bead is formed and a good weld is obtained. As a result, the welding heat input can be remarkably reduced and the welding speed can be enhanced. A strip electrode having a width larger than the groove root gap may be used, but since the material to be welded is rendered molten by means of the arc force, even if the groove root gap is greatly broadened, welding can be accomplished sufficiently. Furthermore in the instance that the groove root gap is much broader than the width of the strip electrode, since the material to be welded is not rendered molten by means of the arc force but by means of the heat of the molten pool, the significance of application of the method of the present invention is lost when the groove root gap is too broad. For example, good results are obtained when the strip electrode has a width of 2 to 50 mm and a thickness of 0.1 to 4 mm. These dimensional conditions of the strip electrode may be appropriately determined depending on the welding conditions, the thickness of the material to be welded, and the like. In general, attainment of the foregoing effects cannot be expected when the width of the strip electrode is smaller than 2 mm. Similarly, when the width of the strip electrode is larger than 50 mm, because of insufficient shielding, blow holes and weld defects such as undercuts and overlaps are readily caused. Furthermore, the arc becomes unstable and gas shielded arc welding is practically impossible. If the thickness of the strip electrode is smaller than 0.1 mm, the manufacturing cost is high and hence, the price of the welded article is inreased. When the thickness of the strip electrode is larger than 4 mm, the current density is lowered and the thermal efficiency is drastically lowered. Furthermore, since the strip electrode having such a large thickness is too hard and the flexibility is decreased, it is very difficult to wind the strip electrode in a coil and it is not practically applicable.

In the vertically upward arc welding method of the present invention, a welding current of 500 to 3000 Amp is preferably employed. When the current is lower than 500 Amp, attainment of the groove-reforming effect cannot be expected and the improvement of the welding efficiency cannot be attained. If a current higher than 3000 Amp is employed, spatters are readily formed and there is brought about the risk that even the backing cooling copper plate may become molten. In short, a good weld cannot be obtained.

Figure 6:
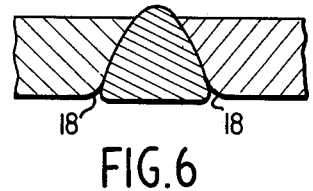
FIG. 6 is a macro-diagram showing defects generated on the section of the bead.

The brittleness of the heat-affected zone will now be discussed. In conventional electroslag welding and electrogas arc welding methods in which welding is completed in one molten pool according to the vertically-upward technique, the welded material is thermally affected within an area extending about 4 mm from the weld bond area and the metal structure is roughened and made brittle. The cause of this undesired phenomenon is the large heat input attending the welding. More specifically, since the sectional area of the groove is large, as mentioned hereinbefore, a large welding heat input is necessary for obtaining molten metal in an amount sufficient to fill this large groove. Furthermore, in the electroslag welding or electrogas welding method, since the material to be welded is rendered molten by means of the heat of the molten pool, in order to prevent lack of fusion, the molten pool is required to have sufficient heat. Therefore, the fused portion on the side of the welded material is drastically affected by the heat. In contrast, when the strip electrode is used in the method of the present invention, since the material to be welded is rendered molten by means of the arc, the penetration is deep but the thermal affects upon the material can be greatly reduced. In short, the material to be heated is not damaged by the heat of the molten pool as in the case of the conventional electrogas arc welding method. Still further, in the conventional electrogas arc welding method, as is shown in FIG. 1, the arc is generated in a portion surrounded by the sliding cooling backing shoes and expansion of the molten pool is inhibited by these cooling copper backing shoes, and hence, the influence on the welded material is further enhanced. In the case of the strip electrode used in the method of the present invention, the arc is uniformly expanded in the groove and the major part of the electrode is located above the top face of the sliding cooling copper backing shoe, and while the arc is being generated, melting is performed sufficiently in the state not inhibited by cooling or the like, and since the molten metal is cooled and solidified by the cooling copper backing shoe disposed below the electrode, the influence of the heat of the molten pool is inhibited as much as possible. However, if the position of the molten pool is excessively lowered and separated from the arc-generating point, a freshly formed groove portion will already be solidified at the time when the melt arrives at the molten pool. As a result, a portion 18 lacking fusion is formed as shown in FIG. 6. In order to prevent the occurrence of this undesired phenomenon, for example, the arc should be generated at the position shown in FIG. 5. More specifically, since the upper end of the strip electrode generates the arc along the groove, it has preferably a substantially triangular shape such that the arc generated from the upper end of the electrode impinges upon the molten pool. This state can be obtained by appropriately adjusting the angle $\theta$ formed between the axial line of the strip electrode and the weld line (this angle will be discussed further hereinafter).

The method of the present invention has the above-mentioned various advantages over the conventional vertically upward welding method. In the method of the present invention, the ratio of the groove gap on the front surface side of the material to be welded to the width of the strip electrode is adjusted within a range of from 0.5 to 3 and the angle formed between the welding advance direction and the strip electrode is 20° to 90°. These requirements will now be discussed in detail.

Figure 7:
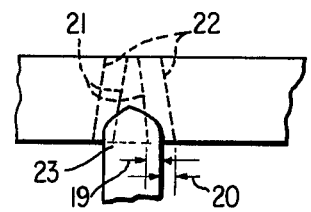
FIG. 7 is a view illustrating the relation between the shape of the groove and the strip electrode.

Referring now to FIG. 7, the relation between the width of the strip electrode and the groove gap on the front surface side is first described. In FIG. 7, reference numeral 23 denotes a strip electrode, reference numerals 21 and 22 denote a groove of a material to be welded, and reference numerals 19 and 20 denote the distances between the terminal portion of the strip electrode and the groove face. If the groove face is inwardly excavated below the terminal portion of the strip electrode 23, the electrode 23 maintains an arc while melting the groove portion. However, when the distance 19 is too large, and if the material to be welded has a large thickness, the heat is not sufficient to melt the material to be welded, and hence, a reverse bead is not formed. The maximum distance capable of providing sufficient melting is 1 to 6 mm when the width of the electrode is 6 to 16 mm, although the maximum distance varies to some extent depending on the width of the electrode. As the width of the electrode is large, the allowable distance is broad. if the terminal portion of the strip electrode is within the groove 22, the maximum distance capable of providing sufficient melting by means of the arc generated from the terminal portion of the electrode is within a range of 3 to 16 mm. In the case of, for example, a strip electrode having a width of 11 mm and a thickness of 1.1 mm, and an operation at 1000 Amp and 38 V, the maximum value of the distance 19 is 2.5 mm and the maximum value of the distance 20 is 10 mm. In the case of the former, the ratio of the groove gap on the front surface side of the material to be welded to the width of the strip electrode is 1 : 2 and in the case of the latter, this ratio is 3 : 1. That is, better results are obtained when the ratio of the groove gap on the front surface side of the material to be welded to the width of the strip electrode is within a range of from 0.5 to 3. In accordance with the method of the present invention, however, the intended objects can be attained sufficiently, if the ratio of the width of the strip electrode to the groove gap on the front surface side of the material to be welded is within a range of from 1:02 to 1:5. If the groove gap on the front surface side of the material to be welded is smaller than 1/5 of the width of the strip electrode, no reverse bead is formed and weld defects such as undercuts are caused. If the groove gap on the front surface side of the material to be welded is larger than 5 times the width of the strip electrode, correction of the groove on the front surface side of the material to be welded becomes impossible and the welding speed is lowered.

The reasons why the angle between the welding advance direction and the strip electrode is adjusted to 20 to 90° in accordance with the method of the present invention are as follows:

If this angle is less than 20°, no sufficient reverse bead is formed, and if this angle exceeds 90°, the back side of the groove of the base metal is excessively molten, and a good front bead cannot be obtained and the arc becomes unstable. For these reasons, in accordance with the present invention, the angle formed between the welding advance direction and the axial line of the strip electrode is adjusted to 20° to 90°.

Figure 15:
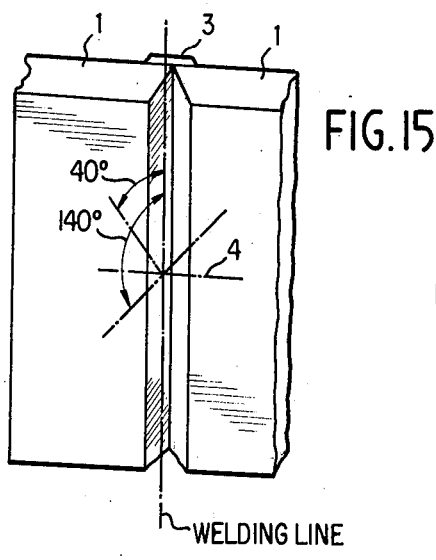
FIG. 15 is a diagram showing the positional relationship between the electrode and the weld line in the vertically upward arc welding method of the present invention.

If the angle between the weld line and the width direction of the strip electrode is less than 40°, melting of the base metal becomes non-uniform and undercuts are readily formed. If this angle exceeds 140°, similar defects are caused. Accordingly accordance with the method of the present invention, this angle is adjusted to 40° to 140° as shown in FIG. 15.

In accordance with the method of the present invention, $(Ar + O_2)$ or $(Ar + CO_2)$ is preferably used as the shielding gas. In general, good results are obtained when Ar containing 1 to 10% of $O_2$ or 5 to 70% of $CO_2$ is employed. In the case of $(Ar + O_2)$, $O_2$ tends to stabilize the arc. If the amount of $O_2$ is smaller than 1%, this arc-stabilizing effect cannot be attained, and when the $O_2$ content is higher than 10%, the amount of $O_2$ in the weld metal is increased and the mechanical properties are adversely affected. In the case of $(Ar + CO_2)$, $CO_2$ also tends to stabilize the arc and increases the penetration depth to a relatively high degree. If the $CO_2$ content is lower than 5%, these effects are not attained, and if the $CO_2$ content is higher than 70%, formation of spatters is so extreme as to jam the shielding gas feed nozzle and form blow holes.

The strip electrode that is used in the present invention will now be described.

In the above-mentioned vertically upward welding method of the present invention, since the material to be welded is quite molten, the melt metal is formed from the melt of the strip electride and the melt of the base metal. In this case, the ratio of the dilution of the material to be welded is about 45 to about 65%. Accordingly, the composition of the strip electrode should be decided by considering its influence on the material to be welded.

More specifically, the strip electrode of the present invention comprises up to 0.15% of C, 0.3 to 3.0% of Mn, 0.05 to 0.95% of Si and 0.05 to 0.7% of Mo as indispensable components, and it further comprises, according to need, at least one member selected from the group consisting of 0.001 to 0.3% of Ti, up to 0.05% of Al, 0.001 to 0.05% of B, 0.001 to 0.1% of Zr and 0.001 to 0.05% of Nb, the balance being unavoidable impurities and Fe. Furthermore, for welding 60 Kg/mm² class high tensile strength steel, 0.01 to 5.0% of Ni, 0.01 to 8.0% of Cr and 0.01 to 3.0% of Cu are further incorporated.

In the instance that the welding is conducted by using a strip electrode according to the method of the present invention, since the dilution ratio of the material to be welded is high and the heat input is relatively large for single layer welding, in order to improve the mechanical properties of the weld, it is indispensable to use a strip electrode having the above-mentioned composition, and when this strip electrode is employed, a sufficiently good weld can be obtained at a high welding speed.

The reasons for the limitations of the contents of the respective components in the strip electrode used in accordance with the present invention will now be described.

C lowers the impact value of the weld metal. Since the C content in the material to be welded is generally 0.15 to 0.17%, the carbon intrudes into the weld metal by dilution and makes the weld metal brittle. Accordingly, the C content should not be higher than 0.15%.

Mn and Si are incorporated as deoxidizing elements so as to prevent the formation of blow holes and improve the mechanical properties of the weld metal. When the Mn content exceeds 3.0%, the tensile strength of the weld metal becomes too high and the impact value is lowered. When the Mn content is lower than 0.3%, no substantial deoxidizing effect can be obtained. If the Si content exceeds 0.95%, the weld portion is drastically brittle and brittle fracture is readily caused. When the Si content is lower than 0.05%, no deoxidizing effect can be obtained. Mn and Si have an effect of improving the impact value, and an especially excellent synergistic effect can be attained when the mixing ratio of Mn and Si is within a specific range. More specifically, when the Mn/Si ratio is within a range of from 2 to 6, the impact value can be highly improved, but when the amount of Si is larger than the amount of Mn, attainment of the improvement of the impact value cannot be expected. Further, if the Mn/Si ratio is within a range of from 2 to 6, the crack resistance can also be improved. For these reasons, in accordance with the present invention, the Mn content is limited to 0.3 to 3.0% and the Si content is limited to 0.05 to 0.95%.

In single layer welding as in the case of the method of the present invention, Mo has an effect of keeping a fine grain size in the structure of the weld metal in which the crystal grains are readily coarsened. Furthermore, when a small amount of Mo is incorporated, it enables the possible improvement of the tensile strength without a reduction of the elongation and area. If the Mo content is higher than 0.7%, the tensile strength becomes too high and if the Mo content is lower than 0.05%, attainment of the above-mentioned effects cannot be expected. For these reasons, the Mn content is limited to 0.05 to 0.7% in accordance with the present invention.

Ti has an effect of highly improving the impact value of the weld metal. Ti is a higher deoxidizing agent than Mn and Si, and it reacts with N in the weld metal to form a nitride. Namely, Ti reduces oxygen in the weld metal by the deoxidizing activity thereof and it further reduces the atomic N to considerably improve the mechanical properties of the weld metal. The N content in the weld metal obtained according to the present invention is 0.004 to 0.007%, and when such amount of N is combined with Ti the impact value of the weld is improved by the thus formed nitride. However, if the amount of Ti exceeds 0.3%, excessive Ti intrudes into the weld metal to make the weld metal brittle. If the Ti content in the electrode is lower than 0.001%, no substantial effect can be obtained. Accordingly, the Ti content is limited to 0.001 to 0.3%.

Al is incorporated as an arc stabilizer, and it is highly effective when welding is conducted by using a large current. The arc is softened and the formation of spatters is reduced. These effects are obtained when the amount of Al is small, and when the Al content exceeds 0.05%, the weld metal is made rather brittle. Accordingly, the amount of Al is limited to up to 0.05%.

When at least one member selected from B, Zr and Nb is incorporated as a component for improving the impact value of the weld metal, the crystal grains are made finer and the impact value is improved. These elements are effective when they are incorporated in very small amounts, and when the B, Zr and Nb contents exceed 0.05%, 0.1% and 0.05%, respectively, the weld metal is made brittle and cracks are readily caused. If each of the B, Zr and Nb contents is lower than 0.001%, no substantial effect can be obtained. Accordingly, the B, Zr and Nb contents are limied to 0.001 to 0.05%, 0.001 to 0.1% and 0.001 to 0.05%, respectively. Since these components are incorporated also from the material to be welded and the backing strip, it is necessary to make sure that their amounts are not excessive. B has a synergistic effect with Ti, and the impact value is highly improved when the Ti/B ratio is within a range of from 2 to 7.

When 60 Kg/mm$^2$ class high tensile strength steel is welded, the impact value can be improved by the incorporation of Ni, Cr and Cu. Ni has an effect of improving the impact value at low temperatures and the tensile strength. However, when the Ni content exceeds 5.0%, cracks are readily caused, and when the Ni content is lower than 0.01%, no effect is obtained. Cr and Cu are incorporated for improving the strength. When the Cr and Cu contents exceed 8.0% and 3.0%, respectively, the strength becomes too great, and when the Cr and Cu contents are lower than 0.1%, no effect is obtained. For these reasons, the Ni, Cr and Cu contents are limited to 0.01 to 5.0%, 0.01 to 8.0% and 0.01 to 3.0%, respectively.

Examples where a material having a thickness of 25 mm was welded by using the strip electrode of the present invention with a V-shaped groove having a groove angle of 25° and a groove gap of 2 mm, and wherein the welding was carried out at 1000 Amp. of welding current, 39V of arc voltage, 20cm/min. of welding speed, and the angle $\theta$ was 50°, will now be described.

EXAMPLE A

Wire: C = 0.07%, Mn = 2.00%, Si = 0.50%, Mo = 0.80%
Material to be welded: SM 53C (JIS)
Mechanical properties: YP = 37.8 Kg/mm$^2$, TS = 55.8 Kg/mm$^2$,
El = 28%, Ra = 65%, vE$_{-10°}$ = 4.8
(YP: yield point, TS: tensile strength,
El: elongation, and vE$_{-10°}$: notch toughness)

EXAMPLE B

Wire: C = 0.07%, Mn = 2.40%, Si = 0.60%, Mo = 0.70%, Ti = 0.25%
Material to be welded: K5D (50 Kg/mm$^2$ class high tensile strength steel)
Mechanical properties: YP = 40.0 Kg/mm$^2$, TS = 67.2 Kg/mm$^2$, El = 27%, vE$_{-10°}$ = 7.0

EXAMPLE C

Wire: C = 0.08%, Mn = 2.30%, Si = 0.60%, Mo = 0.70%, Ti = 0.15%, B = 0.007%
Material to be welded: K5D (50 Kg/mm$^2$ class high tensile strength steel)
Mechanical properties: YP = 40.1 Kg/mm$^2$, TS = 58.9 Kg/mm$^2$, El = 27%, vE$_{-10°}$ = 10.0

EXAMPLE D

Wire: C = 0.06%, Mn = 1.55%, Si = 0.60%, Ni = 1.00%, Cr = 0.30%, Mo = 0.30%, Ti = 0.18%
Material to be welded: SM-58 (JIS)
Mechanical properties: YP = 51.0 Kg/mm$^2$, TS = 62.2 Kg/mm$^2$, El = 21%, vE$_{-10°}$ = 5.6

The weld metals obtained in the above examples showed good results in bead appearance and bending tests.

Figure 16A:
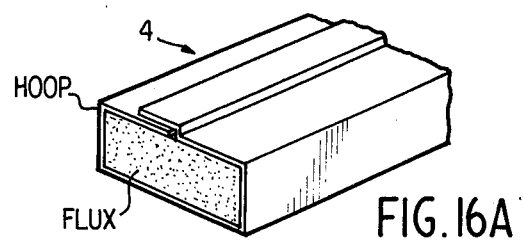
FIGS. 16A and 16B are perspective views showing a flux-cored strip electrode that can be used in the vertically upward arc welding method of the present invention.
Figure 16B:
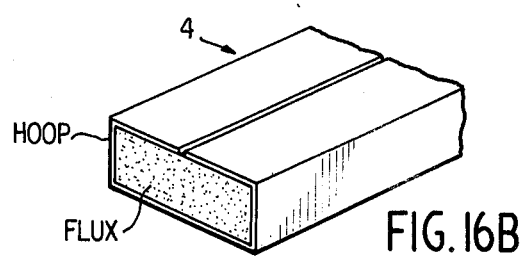

As the strip electrode, not only a solid strip electrode but also a flux-pored strip electrode comprising a flux 2 filled therein, as shown in FIGS. 16A and 16B, can be used in accordance with the present invention.

The flux-cored strip electrode that can be used in accordance with the present invention will now be described.

A flux comprising iron powder, deoxidizing agents, slag-forming agents and other additives is incorporated in the interior of a strip electrode so that the amount of the flux is 3 to 60% by weight based on the total weight of the electrode. Particles having a size of 74 to 297$\mu$ occupy at least 20% of the total weight of the flux with respect to the flux-cored strip electrode, the flux is more readily movable in the interior of the electrode than in the case of a flux-cored wire having a round section. Accordingly, the particle size and the distribution thereof should be regulated in the case of the flux-cored strip electrode. Flux particles having a size smaller than 74$\mu$ are readily movable and since the flux-cored strip electrode is molded by folding a hoop, when these fine flux particles are employed, no good flow is not attained for the step of conducting the flux into the interior of the electrode and it is difficult to maintain a prescribed incorporation ratio of the flux. In the case of a flux having a particle size larger than 297$\mu$, voids are readily formed in the electrode and poor effects are imposed on the welding operation. Furthermore, these large particle are readily movable in the interior of the electrode. Accordingly, a flux having a particle size of 74 to 297$\mu$ is most stable. The foregoing disadvantages are brought about when the content of particles having a size of 74 to 297$\mu$ is lower than 20%, from the industrial viewpoint. Accordingly, in accordance with the present invention, it is specified that particles having a size of 74 to 297$\mu$ occupy at least 20% of the entire flux.

When the amount of the flux is smaller than 3% based on the total weight of the electrode, the slag-forming effect is insufficient and the amount of the gas generated is insufficient to shield the weld zone. When the amount of the flux exceeds 60% based on the total weight of the electrode, the density of the welding current becomes too high on the electrode and the electrode is often burnt off. Accordingly, it is preferred that the amount of the flux be 3 to 60% based on the total weight of the electrode.

The flux comprises the following indispensable components, each percent being based on the total weight of the electrode:

Mn: 0.4 to 3.0%
Si: 0.01 to 1.0%
Mo: 0.05 to 1.5%
slag-forming agent: 0.1 to 15% (excluding metal fluoride)
metal fluoride: 0.01 to 10%

At least one of the following elements may be added to the flux:

Ti: 0.001 to 0.6%
Zr: 0.001 to 0.1%
B: 0.01 to 0.05%
Al: up to 0.05%
Nb: 0.001 to 0.05%

Furthermore, the flux may comprise 0.1 to 10% of $SiO_2$ as a slag-forming agent, based on the total weight of the strip electrode.

According to need, the flux may further include at least one of the following components:

Ni: 0.01 to 5.0%
Cr: 0.01 to 8.0%
Cu: 0.01 to 3.0%

Mn, Si and Ti are deoxidizing agents, and they react with CO causing blow holes and remove the CO by depriving oxygen from CO, while they are converted to oxides. Furthermore, they react with oxygen to reduce the oxygen content in the weld metal. The so formed oxides, MnO, $SiO_2$ and $TiO_2$, rise and float as slags and are precipitated on the surface of the bead. Accordingly, these deoxidizing agents also act as slag-forming agents. Mn is generally added in the form of Fe-Mn or metallic Mn. It not only acts as a deoxidizing agent but also has the effect of improving the toughness of the weld metal and enhancing the elongation. When the Mn content is lower than 0.4%, the above effects are insignificant, and when the Mn content exceeds 3.0%, the weld metal is made brittle whereby cracks result. Mn also has the effect of improving the tensile strength and providing a good yield point of the weld metal.

Si has a high deoxidizing effect and it is incorporated mainly for preventing the formation of blow holes. A good deoxidizing effect can be obtained even if Si is incorporated in a small amount. However, if the amount of Si is smaller than 0.01, no substantial effect can be obtained. When the amount of Si exceeds 1.0%, the weld metal is made brittle.

In a case of the large heat input, in single-layer welding as in the welding method of the present invention, the crystal grains are readily coarsened in the structure of the weld metal. Mo has the effect of making finer these crystal grains in the structure of the weld metal, and as a result, an improved impact value can be obtained. Furthermore, incorporation of a small amount of Mo is effective for improving the tensile strength without a reduction of the elongation and the contracton of the area. When the Mo content exceeds 1.5%, the tensile strength becomes too high. If the Mo content is lower than 0.05%, no effect is obtained. For these reasons, the Mo content is limited to 0.05 to 1.5%.

Ti has the effect of improving the impact value of the weld metal. Ti has a higher deoxidizing effect than Mn and Si, and it reacts with N in the weld metal to form a nitride. Namely, Ti reduces the oxygen content in the weld metal by the deoxidizing action thereof and reduces the atomic N to considerably improve the mechanical properties of the weld metal. The N content in the weld metal obtained according to the present invention is 0.004 to 0.010%, and when such N is combined with Ti, solidification takes place with the highmelting-point nitride being at the center. Accordingly, the weld zone comes to have a very fine texture having a much reduced initially precipitated ferrite and the impact value is highly improved.

When the Ti content exceeds 0.6%, excessive Ti intrudes into the weld metal making it brittle. When the Ti content is lower than 0.001%, attainment of the foregoing effects cannot be expected. Accordingly, the Ti content is limited to 0.001 to 0.6%.

With respect to the limitations of Al, as mentioned before, Al has an arc stabilizing effect and is limited up to 0.05%.

In order to improve the impact value of the weld, at least one of 0.001 to 0.05% of B, 0.001 to 0.1% of Zr, and 0.001 to 0.05% of Nb may be further added to the flux. If these elements are incorporated in amounts within these ranges, the structure of the weld metal is made finer and the impact value is improved, as in the case of a solid strip electrode.

The slag-forming agent forms a slag covering the bead surface during the welding so as to shield the heated weld metal from the atmosphere and thus prevents the bead surface from being oxidized. After the slag is removed when the weld is sufficiently cooled, a beautiful bead appearance is obtained. As pointed out hereinbefore, formation of scratches on the weld metal by the sliding water cooling copper backing shoe supporting the weld metal can effectively be prevented by forming a slag between the backing shoe and the bead surface. As the slag-forming agent, there is used at least one member selected from metal oxides such as $TiO_2$, $Ti_2O_3$, MgO, ZrO, $Al_2O_3$, CaO, MnO, $MnO_2$, $K_2O$, $Na_2O$, FeO and the like, and carbonates such as $CaCO_3$, $MgCO_3$, $BaCO_3$ and the like. These substances recited as slag-forming agents are effectual for forming slags, and for this reason, they are called slag-forming agents. Metal fluorides described hereinafter are included in the slag-forming agent, but they exhibit different effects in addition to the slag-forming activity. Accordingly, they are considered separately from the slag-forming agents in the instant specification.

Metal oxides also have an effect of stabilizing the arc, and they maintain the arc in the sprayed state to reduce formation of spatters. Especially in the case of the flux-cored strip electrode, if the transfer of the droplet is of the globular type, the above-mentioned characteristic of deep excavation of the groove is lost. Accordingly, if the arc is kept in the sprayed state, penetration is uniformly advanced in the groove and lack of fusion is not caused while formation of spatters is prevented.

When the slag-forming agent content is lower than 0.1% the amount of the slag-forming agent is insufficient and the bead surface is not covered completely, with the result that the bead becomes non-uniform. When the slag-forming agent content exceeds 15%, a slag bath is formed in the molten pool to inhibit uniform generation of the arc and render the arc unstable. Furthermore, because of an excessive amount of the slag, undercuts are formed. For these reasons, the slag-forming agents content is limited to 0.1 to 15%. Among the foregoing metal oxides, $SiO_2$ is especially effective, and a mineral substance containing $SiO_2$, such as silica sand and sericite, has the effect of uniformly distributing the slag on the bead surface and providing a slag having a good peeling property. However, when the $SiO_2$ content is lower than 0.1%, no effect is obtained, and when the $SiO_2$ content exceeds 10%, the basicity of the slag deviates toward the acidic side and the impact value is reduced. Accordingly, the $SiO_2$ content is limited to 0.1 to 10.0%.

Metal fluorides such as $CaF_2$, NaF, $BaF_2$, LiF, $MgF_2$, $TiF_4$, $AlF_3$, $Na_3AlF_6$ and the like not only act as slag-forming agents but also have the effect of refining the molten metal and separating non-metallic inclusions into the slag. They also have desulfurizing and dephosphorizing effects. Accordingly, they are very effective substances. In general, fluorite and $CaF_2$ are employed, and other metal fluorides as mentioned above may be incorporated. Two or more of these metal fluorides may be incorporated in combination. Especially in the case of the strip electrode, the arc is broadened and it is likely to include therein ambient air. Hence, the intended effects can be further enhanced by the incorporation of the metal fluoride.

When the metal fluoride content is lower than 0.1%, attainment of the foregoing effects cannot be expected, and when the metal fluoride content exceeds 10%, the arc becomes unstable and the formation of spatters is enhanced, with the result that no practical utility is obtained.

In addition, the effect of lowering the melting point of the slag and obtaining a good covering condition on the entire bead surface can also be attained by the incorporation of the metal fluoride.

In the case of 60 $Kg/mm^2$ class high tensile strength steel, an appropriate combination of the tensile strength and impact value can be obtained by the incorporation of Ni, Cr and Cu. Ni has an effect of improving the impact value at low temperatures and the tensile strength. If the Ni content exceeds 5.0%, cracks are readily caused, and if the Ni content is lower than 0.01%, no effect is obtained. Cr and Cu are incorporated for improving the strength. If the Cr content exceeds 8.0% or the Cu content exceeds 3.0%, the strength becomes too high, and if the Cr and Cu contents are lower than 0.01%, no effect is obtained. Accordingly, it is preferred that the Ni, Cr and Cu contents be limited to 0.01 to 5.0%, 0.01 to 8.0% and 0.01 to 3.0%, respectively. Alloying elements may be added to the flux in the form of metallic substances and/or metallic compounds.

Embodiment of the flux-cored strip electrode of the present invention will now be described. The flux content in the electrode was adjusted to 20% and the strip electrode used had a thickness of 1.2 mm and a width of 11 mm.

EXAMPLE E

[Welding Conditions]

Torch angle: 45°
Thickness of base metal: 25 mm
Groove configuration: V-shaped, groove angle of 20°, groove gap of 3mm
Welding current: 1000 Amp
Arc voltage: 36 V
Welding speed: 25 cpm
shielding gas: 80% Ar + 20% $CO_2$, flow rate of 50 l/min
Power source for welding: constant voltage direct current, electrode positive (+).
Welding electrode: flux-cored strip electrode, flux is incorporated in an amount of 20% based on the total weight of the electrode.

[Composition of Flux, % by weight of the flux]
[Amount shown in ( ) means the weight percent based on the total electrode]

| Component | Flux No. 1 | 2 | 3 | 4 | 5 | 6 | 7 | 8 |
|---|---|---|---|---|---|---|---|---|
| $CaF_2$ | | 3 (0.6) | 5 (1.0) | 2.5 (0.5) | 4 (0.8) | 4 (0.8) | 5 (1.0) | 4 (0.8) |
| NaF | 6 (1.2) | 3 (0.6) | | 2.5 (0.5) | 1 (0.2) | 1 (0.2) | 2.5 (0.5) | 1 (0.2) |
| $CaCO_3$ | | | | | 1.5 (0.3) | 1 (0.2) | | |
| $TiO_2$ | | 5 (1.0) | | | | 2.5 (0.5) | | |
| $SiO_2$ | 5 (1.0) | | | 2.5 (0.5) | 2.5 (0.5) | | 2.5 (0.5) | 2.5 (0.5) |
| $MnO_2$ | | | 5 (1.0) | | | | | 2.5 (0.5) |
| Mn | 10 (2.0) | 10 (2.0) | 10 (2.0) | 10 (2.0) | 10 (2.0) | 12 (2.4) | 11.5 (2.3) | 8 (1.6) |
| Si | 2 (0.4) | 2 (0.4) | 2 (0.4) | 2 (0.4) | 2.5 (0.5) | 3 (0.6) | 3 (0.6) | 3 (0.6) |
| Mo | 2.5 (0.5) | 2.5 (0.5) | 2.5 (0.5) | 2.5 (0.5) | 4 (0.8) | 3.5 (0.7) | 3.5 (0.7) | 1.5 (0.3) |
| Ti | 1.5 (0.3) | 1.5 (0.3) | 1 (0.2) | 0.5 (0.1) | 0.02 (0.004) | 1.25 (0.25) | 0.75 (0.15) | 2 (0.4) |
| B | | | | 0.025 (0.005) | | | 0.035 (0.007) | |
| Ni | | | | | | | 5 (1.0) | 5 (1.0) |
| Cr | | | | | | | 1.5 (0.3) | 1.5 (0.3) |
| Cu | | | | | | | | 1 (0.2) |
| balance essentially Fe powder | 73 | 73 | 71.975 | 76 | 74.98 | 72.75 | 62.215 | 19 |

[Chemical Analysis Values of Base Metal, % by weight]

| Flux No. | C | Mn | Si | P | S |
|---|---|---|---|---|---|
| 1 | 0.15 | 1.07 | 0.24 | 0.011 | 0.013 |
| 2 | 0.13 | 1.43 | 0.39 | 0.011 | 0.015 |
| 3 | 0.13 | 1.43 | 0.39 | 0.011 | 0.011 |
| 4 | 0.13 | 1.43 | 0.39 | 0.016 | 0.015 |
| 5 | 0.13 | 1.43 | 0.39 | 0.011 | 0.015 |
| 6 | 0.11 | 1.24 | 0.35 | 0.015 | 0.011 |
| 7 | 0.13 | 1.20 | 0.37 | 0.010 | 0.017 |
| 8 | 0.13 | 1.24 | 0.38 | 0.011 | 0.017 |

[Chemical Analysis Values of Weld Metal, % by weight]

| Flux No. | C | Mn | Si | P | S | Ti | Mo |
|---|---|---|---|---|---|---|---|
| 1 | 0.11 | 1.04 | 0.30 | 0.011 | 0.009 | 0.020 | 0.26 |
| 2 | 0.10 | 1.32 | 0.37 | 0.013 | 0.010 | 0.019 | 0.25 |
| 3 | 0.10 | 1.33 | 0.35 | 0.013 | 0.010 | 0.012 | 0.26 |
| 4 | 0.10 | 1.33 | 0.36 | 0.013 | 0.010 | 0.010 | 0.27 |
| 5 | 0.10 | 1.35 | 0.39 | 0.013 | 0.010 | 0.005 | 0.32 |
| 6 | 0.09 | 1.41 | 0.40 | 0.015 | 0.010 | 0.013 | 0.30 |
| 7 | 0.10 | 1.40 | 0.39 | 0.015 | 0.010 | 0.011 | 0.31 |
| 8 | 0.10 | 1.25 | 0.40 | 0.016 | 0.010 | 0.023 | 0.12 |

[Welding Results]

| Flux No. | YP (Kg/mm$^2$) yield point | TS (Kg/mm$^2$) tensile strength | vEo (Kg-m) notch toughness | vE$_{-10}$(Kg-m) notch toughness | Appearance of Bead | Side Bending |
|---|---|---|---|---|---|---|
| 1 | 37.0 | 48.5 | 11.2 | 7.3 | good | good |
| 2 | 49.8 | 63.2 | 9.2 | 6.5 | good | good |
| 3 | 46.7 | 60.4 | 11.3 | 6.7 | good | good |
| 4 | 48.5 | 64.5 | 10.5 | 6.6 | good | good |
| 5 | 47.0 | 61.2 | 9.5 | 4.9 | good | good |
| 6 | 51.1 | 65.5 | 11.0 | 6.6 | good | good |
| 7 | 54.0 | 70.9 | 9.8 | 7.7 | good | good |
| 8 | 51.0 | 62.5 | 8.0 | 6.3 | good | good |

Figure 8:
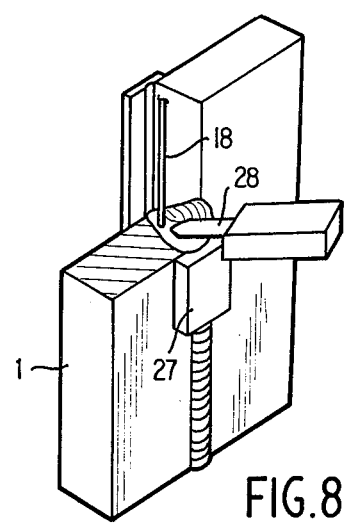
FIG. 8 is a perspective view showing one embodiment of the vertically upward arc welding method of the present invention.

An embodiment of the present invention in which a filler metal is disposed in advance in the groove will now be described by reference to FIG. 8. It is preferred that a filler metal 18 be disposed in the inner part of the groove. Vertically upward welding is conducted while melting this filler metal 18. In FIG. 8, a material to be welded 1, a sliding water-cooling copper backing shoe 27 on the front side, and a strip electrode 28, are respectively disclosed.

As the filler metal, there may be employed a solid bar including deoxidizing agents and alloying components for improving the mechanical properties of the weld, or a tubular bar comprising a metal tube in which deoxidizing agents, allowing elements and slag-forming agents are incorporated. Furthermore, a coated bar formed by coating a core metal with coating components, deoxidizing agents, and iron powder may also be utilized.

Figure 9:
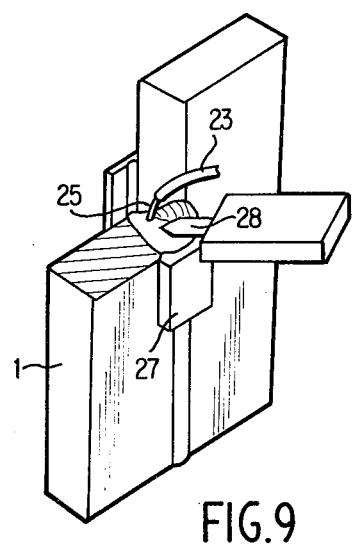
FIG. 9 is a perspective view showing another embodiment of the vertically upward arc welding method of the present invention.
Figure 10:
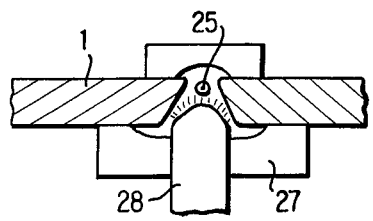
FIG. 10 is a horizontal cross-sectional view showing still another embodiment of the vertically upward arc welding method of the present invention.
Figure 11:
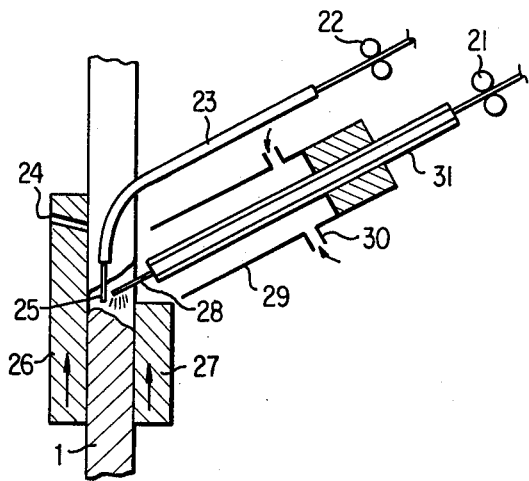
FIG. 11 is a longitudinal sectional view showing still another embodiment of the vertically upward arc welding method of the present invention.
Figure 12:
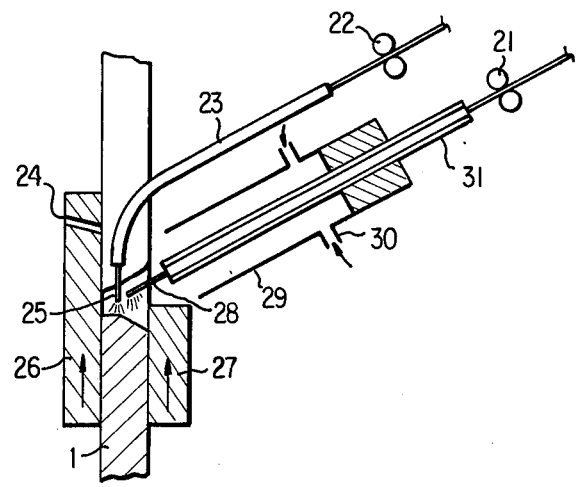
FIG. 12 is a longitudinal sectional view showing still another embodiment of the vertically upward arc welding method of the present invention.
Figure 13:
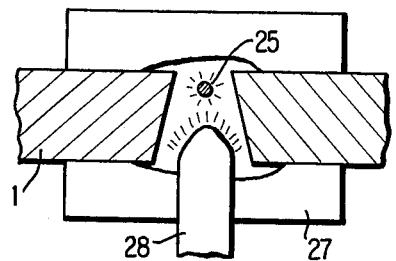
FIG. 13 is a horizontal cross-sectional view showing still another embodiment of the vertically upward arc welding method of the present invention.

Feeding of the filler metal to the vicinity of the arc of the strip electrode in the present invention will now be described by reference to FIGS. 9, 10 and 11, in which a strip electrode feed roller 21, a filler metal feed roller 22, a filler metal guide nozzle 23, a shield gas feed inlet 24, a filler metal 25, a sliding water-cooling copper backing shoe 26 on the back side, a sliding water-cooling copper backing shoe 27 on the front side, a strip electrode 28, a shielding gas feed nozzle 29, a shielding gas feed inlet 30 and an electricity-applying tip 31, are respectively disclosed. The filler metal 25 is fed to the vicinity of the arc of the strip electrode 28 through the guide nozzle 23 by means of the feed roller 22. The guide nozzle 23 is a copper pipe and is grounded to a material to be welded. Since an arc is generated between the filler metal 25 and the strip electrode 28, the filler metal is rendered completely molten by means of the heat of the arc and the heat of the molten pool disposed therebelow. This molten pool is maintained from both the front and back sides by the sliding water-cooling copper backing shoes. As is shown in FIG. 11, the sliding water-cooling copper backing shoe 26 on the back side is longer than the sliding water-cooling copper backing shoe 27 on the front side. The reason is that when the welding is performed by using the strip electrode 28, the arc is generated above the sliding water-cooling copper backing shoe 27 on the front side. The shielding gas feed inlet 24 is formed on the sliding water-cooling copper backing shoe 26 on the back side and the shielding effect can be further enhanced. The sliding water-cooling copper backing shoe 26 on the back side is supported from the front side through the root gap by means of a supporting arm, not shown, and is pressed to the material 1 to be welded. A water-cooling copper pipe, a shielding gas pipe and the like are inserted from the front side. Accordingly, the water-cooling copper backing shoes, the strip electrode torch, the filler metal feed torch and the like are integrally disposed on the same carriage, and hence, the welding can be performed from the front side and, more specifically, from the outside of a side plating. Accordingly, the welding can be performed with high efficiency. It is preferred that the filler metal 25 be fed from above as shown in the drawings. It is also preferred that the filler metal 25 be fed to a sharp tip of the arc of the strip electrode 28 as shown in FIG. 10. If the filler metal is fed to an inner part, since the arc does not impinge upon the filler metal 25, the filler metal 25 is projected into the molten pool and left in the non-molten state, and it is impossible to feed the filler metal in a sufficient amount. In contrast, thereto, if the filler metal feed position is too far ahead of the arc, since the arc is generated only up to the above-mentioned position, defects such as lack of fusion take place in the inner part of the groove. Accordingly, it is preferred that the filler metal feed position be within a region of from the vicinity of the back face of the material to be welded to the center of the thickness of the material to be welded.

An embodiment of the method of the present invention in which the sliding backing shoe 27 on the front side of the groove is lifted in compliance with the rising speed of the molten pool will now be described.

Figure 14:
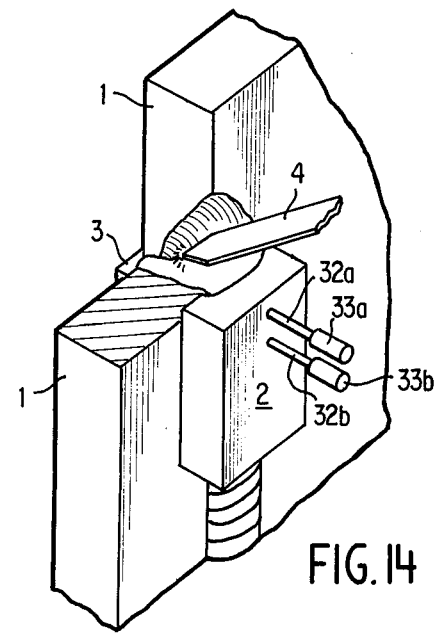
FIG. 14 is a partially sectional perspective view showing still another embodiment of the vertically upward arc welding method of the present invention.

Referring now to FIG. 14, two inspection holes are formed on a sliding backing shoe 2, and photo-detectors 33a and 33b are disposed through supporting cylinders 32a and 32b which are operatively connected to these inspection holes. A photodetector element, an amplifying circuit and an "on-off" circuit are disposed in each photodetector. The "on-off" circuits in the photodetectors 33a and 33b are connected to a driving motor (not shown) for lifting the sliding backing shoe 2. These "on-off" circuits in the photodetectors 33a and 33b are arranged so that when the photodetector elements 32a and 32b do not detect the light of the molten metal, the corresponding circuits are disposed to the off condition so as to stop the driving motor. Since the welding operation is continued even while the sliding backing shoe 2 is not lifted, the molten pool gradually rises, and finally it arrives at the position clogging the inspection hole connected to the photodetector 33b. At this point, the photodetector element in the photodetector 33b detects the light of the molten metal to disposed the "on-off" circuit to the on condition so as to drive the driving motor. When the molten pool further rises to the position clogging the inspection hole connected to the photodetector 33a, the photodetector element in the photodetector 33a detects the light of the molten metal to disposed the "on-off" circuit to the "on" condition whereby the driving speed of the driving motor is increased to increase the rising speed of the backing strip 2. As a result, the rising speed of the backing strip 2 is made greater than the rising speed of the molten pool. In this manner, the sliding backing strip can be synchronously lifted with the rising of the surface of the molten pool.

As is apparent from the foregoing illustration, according to the method of the present invention, since the welding is conducted while excavating, by melting the groove, the wide extent and strong force of the arc from the strip electrode make it possible that a deep and sufficient penetration is obtained. Accordingly, the sectional area of the groove can be remarkably reduced and hence, the welding heat input can be reduced and the welding efficiency can be enhanced. Further, the toughness of the heat-affected zone can be improved. These are excellent effects attained by the present invention. Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A vertically upward arc welding method for base metal workpieces having a narrow welding groove space formed therebetween comprising the steps of:

feeding a strip electrode in a direction at which the plane including the width direction of said electrode crosses the weld line such that the angle formed between the welding advance direction and the longitudinal axis of said strip electrode is in the range of 20° to 90°, generating an arc from said electrode to a base metal portion of the workpieces, melting the upper base metal over a sliding backing shoe disposed on the front side surface of the welding groove space, and performing said welding by expanding the welding groove space by forming an excavated portion of the base metal portion and dropping the molten metal onto a molten pool and depositing the same therein wherein the ratio of the width of the strip electrode to the welding groove space defined on the front side of the base metal workpieces is within the range of 1 : 0.2 to 1 : 5.

2. A vertically upward arc welding method according to claim 1, wherein the weld zone is shielded by a gas.

3. A vertically upward arc welding method according to claim 1, wherein a welding current of 500 to 3000 Amp is used.

4. A vertically upward arc welding method according to claim 1, wherein the angle formed between the weld line and the width direction of the strip electrode is in the range of 40° to 140°.

5. A vertically upward arc welding method according to claim 1, wherein the strip electrode used consists essentially of up to 0.15% of C, 0.3 to 3.0% of Mn, 0.05 to 0.95% of Si and 0.05 to 0.7% of Mo as indispensable components, the balance being unavoidable impurities and iron.

6. A vertically upward arc welding method according to claim 1, wherein the strip electrode used is a consumable strip electrode consisting essentially of up to 0.15% of C, 0.3 to 3.0% of Mn, 0.05 to 0.95% of Si and 0.05 to 0.7% of Mo as indispensable components, and at least one member selected from the group consisting of 0.001 to 0.3% of Ti, up to 0.05% of Al, 0.001 to 0.05% of B, 0.001 to 0.1% of Zr and 0.001 to 0.05% of Nb, the balance being unavoidable impurities and iron.

7. A vertically upward arc welding method according to claim 1, wherein a flux is incorporated in the strip electrode.

8. A vertically upward arc welding method according to claim 7, wherein the flux is incorporated in an amount of 3 to 60% based on the total weight of the strip electrode and particles having a size of 74 to 297μ occupy at least 20% of the total weight of the flux.

9. A vertical-up arc welding method according to claim 8, wherein the flux comprises, in percent based on the total weight of the strip electrode 0.4 to 3.0% of Mn, 0.01 to 1.0% of Si, 0.05 to 1.5% of Mo, 0.1 to 15% of a slag-forming agent and 0.01 to 10% of a metal fluoride.

10. A vertical-up arc welding method according to claim 9, wherein the flux further comprises at least one of the following elements,
Ti: 0.001 to 0.6%
Zr: 0.001 to 0.1%
B: 0.01 to 0.05%
Al: up to 0.05% and
Nb: 0.001 to 0.05%
based on the weight of the total electrode.

11. A vertical-up arc welding method according to claim 9, wherein the flux comprises $SiO_2$ as the slag-forming agent in an amount of 0.1 to 10% based on the total weight of the strip electrode.

12. A vertically upward arc welding method according to claim 9, wherein the flux further comprises at least one of the following elements,
Ni: 0.01 to 5%
Cr: 0.01 to 8% and
Cu: 0.01 to 3%
based on the total weight of the strip electrode.

* * * * *